United States Patent [19]

Thompson

[11] Patent Number: 4,699,795

[45] Date of Patent: Oct. 13, 1987

[54] METHOD FOR DEPOSITING CHOCOLATE CHIPS AND THE LIKE ONTO EDIBLE FOOD PRODUCTS

[75] Inventor: John M. Thompson, Alton, Ill.

[73] Assignee: Ralston Purina Company, St. Louis, Mo.

[21] Appl. No.: 932,704

[22] Filed: Nov. 19, 1986

Related U.S. Application Data

[62] Division of Ser. No. 808,465, Dec. 13, 1985, Pat. No. 4,655,161.

[51] Int. Cl.$^4$ ............................................... A23L 1/00
[52] U.S. Cl. ..................................................... 426/289
[58] Field of Search ................................. 426/289, 295

[56] References Cited

U.S. PATENT DOCUMENTS

| 2,865,766 | 12/1958 | Christianson et al. | 426/289 |
| 3,648,596 | 3/1972 | Zito | 426/289 |
| 4,045,584 | 8/1977 | Jones et al. | 426/289 |
| 4,431,678 | 2/1984 | Sollich | 426/306 |

Primary Examiner—R. N. Jones
Assistant Examiner—Mary S. Mims
Attorney, Agent, or Firm—Price, Heneveld, Cooper, DeWitt & Litton

[57] ABSTRACT

A method is disclosed for depositing soft, frangible food materials on an edible food product wherein the pieces to be deposited are feed from as hopper and conveyed to a depositor roll having pockets and subsequently conveyed into the product to be coated thereby preventing the coating product from breaking.

17 Claims, 10 Drawing Figures

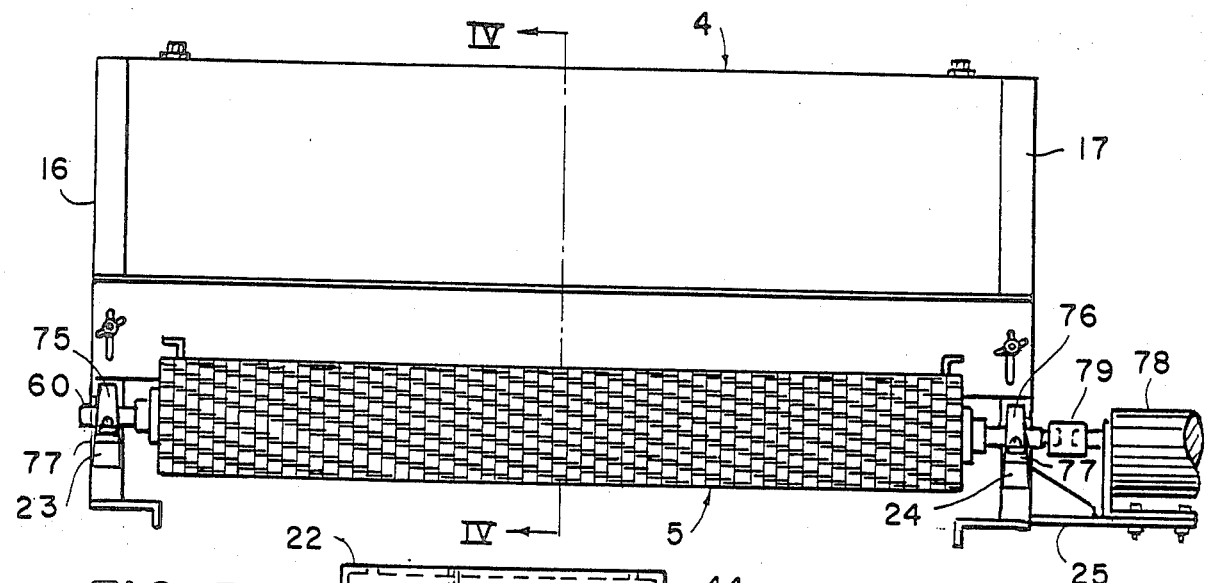
FIG. 3
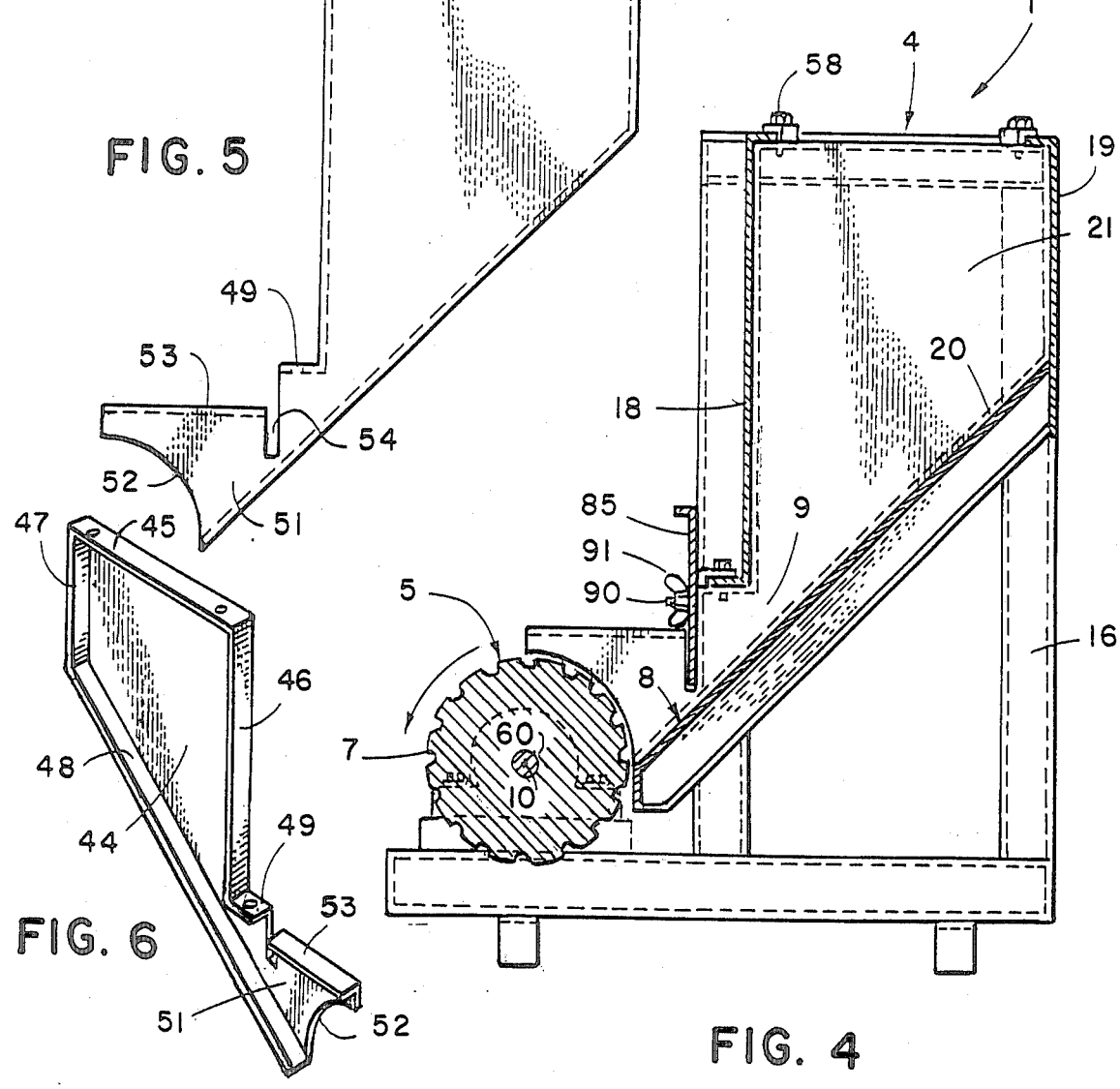
FIG. 5
FIG. 6
FIG. 4

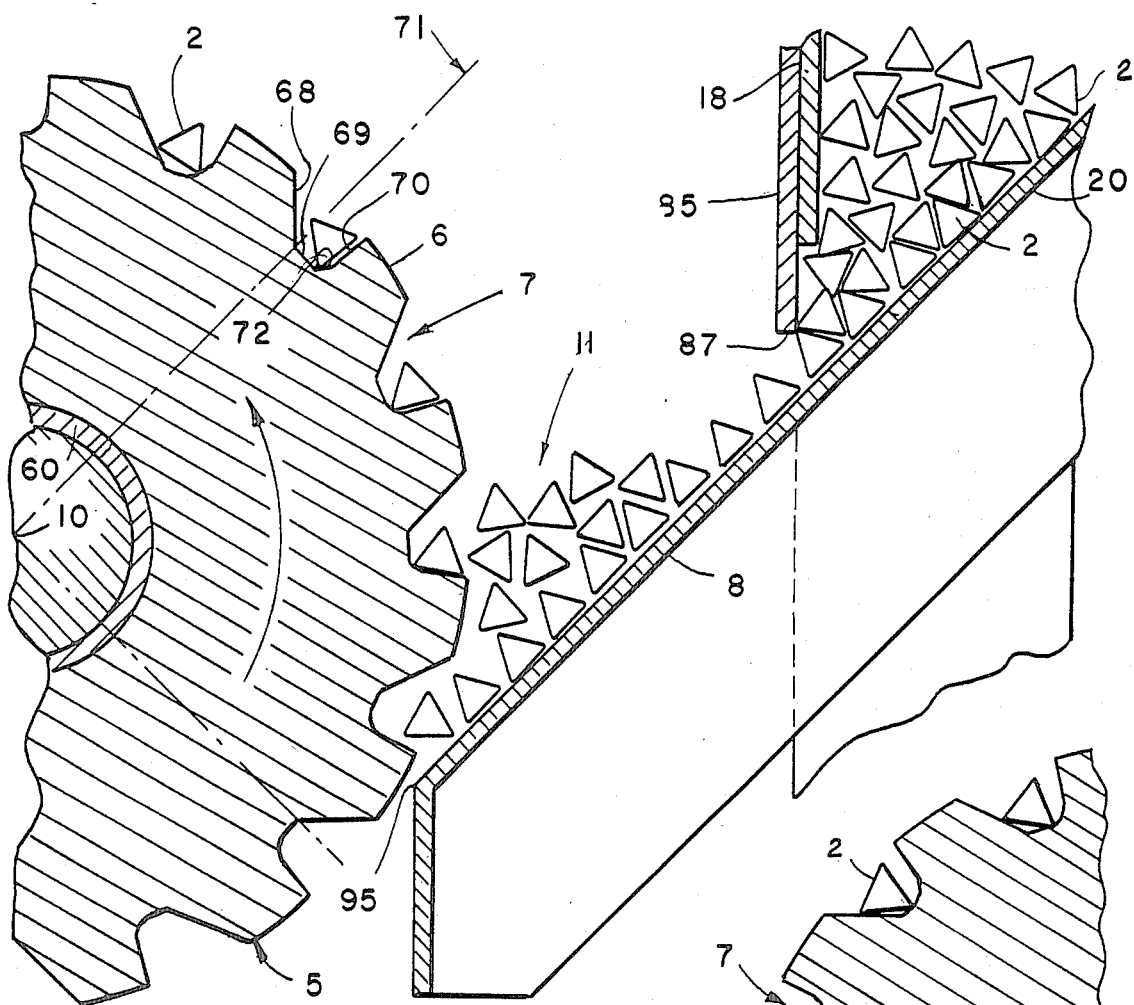
FIG. 7
FIG. 8
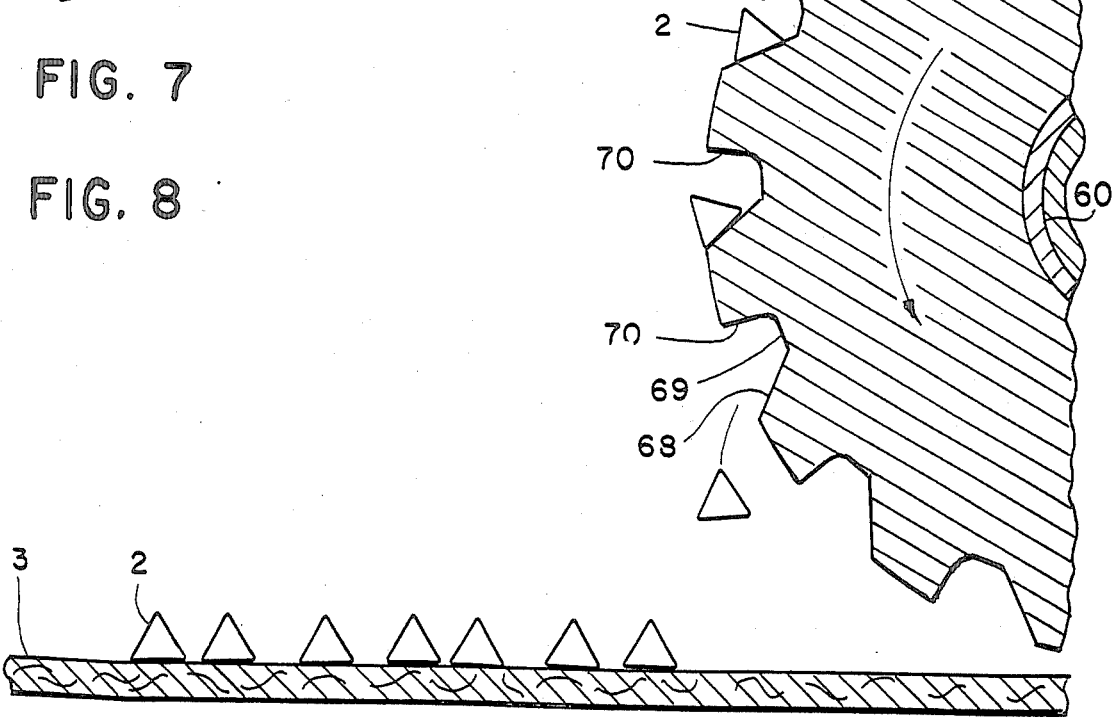

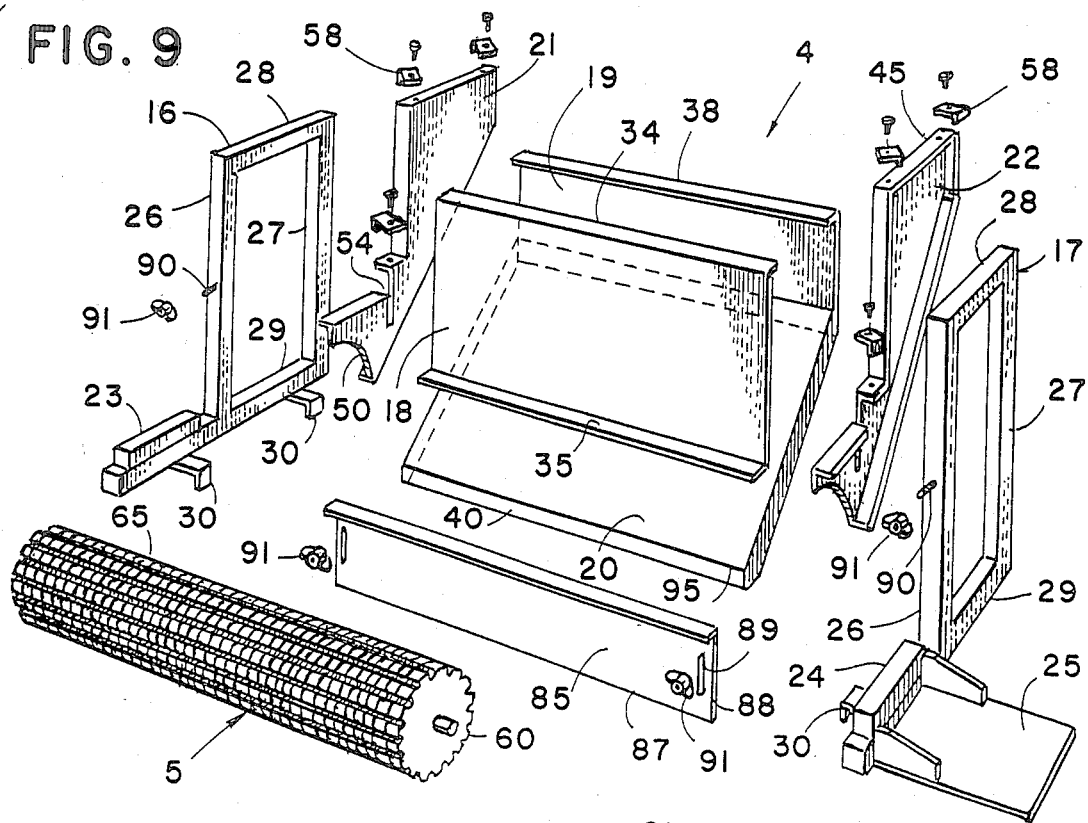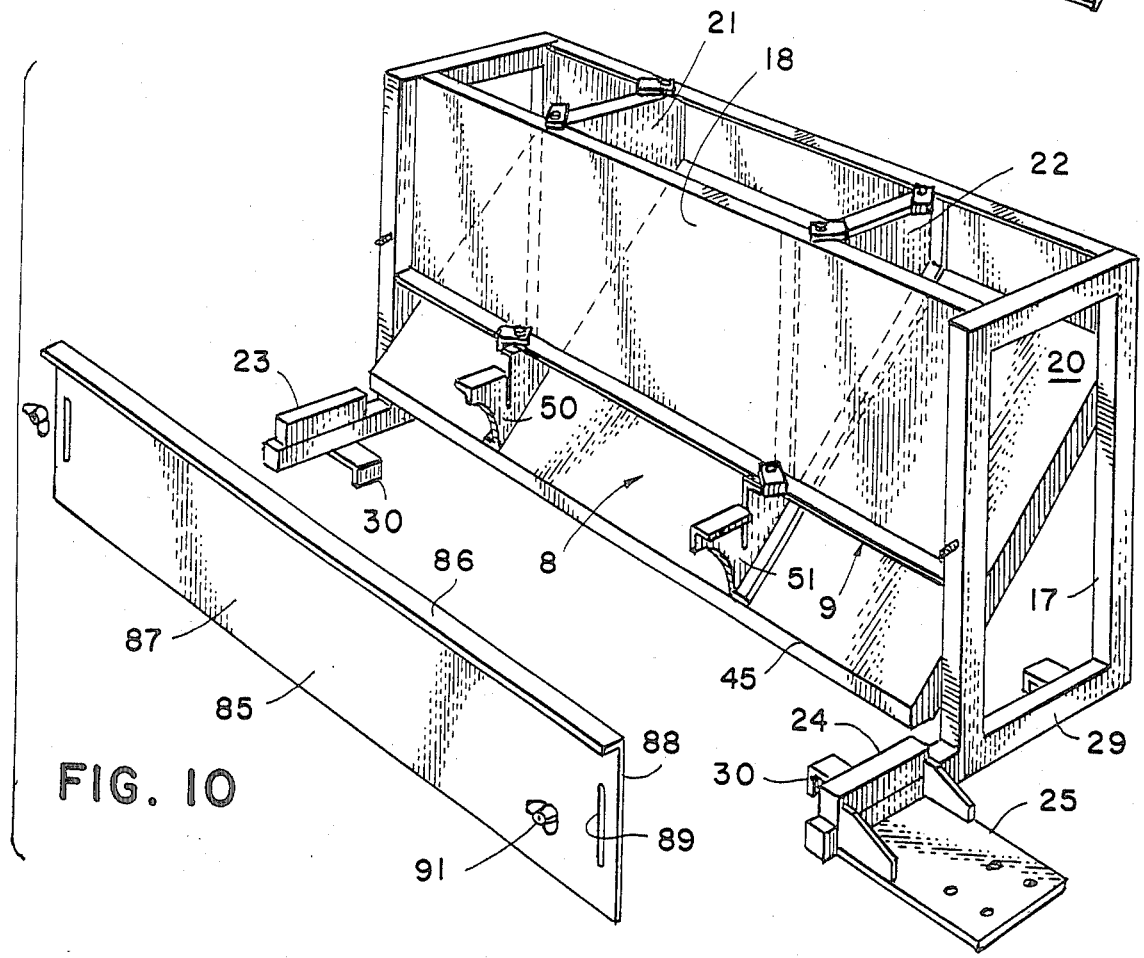

METHOD FOR DEPOSITING CHOCOLATE CHIPS AND THE LIKE ONTO EDIBLE FOOD PRODUCTS

This is a divisional of copending application Ser. No. 06/808,465, filed on Dec. 13, 1985, now U.S. Pat. No. 4,655,161.

BACKGROUND OF THE INVENTION

The present invention relates to the field of edible food processing, and in particular, to an apparatus and method of depositing chips of chocolate, fudge, and the like onto food products.

In the processing of certain types of edible, human food products, relatively fragile bits or chips of confection are deposited onto food articles conveyed therebelow. For example, in the manufacture of granola bars, and other similar food items, morsels or chips of chocolate or fudge (hereinafter referred to as "chips") are sprinkled on top of a continuously moving sheet or layer of granola. The chips are deposited at a predetermined flow rate, which is varied to coordinate with the speed of the overall process. The chips and the granola are subsequently pressed together, and cut to shape.

The chips are typically quite soft and fragile, such that they must be handled very gently in order to avoid breaking and/or smashing the chips, which can clog the chip depositor, and/or detract from the appearance and quality of the processed food article. Conventional depositor machines and methods that are presently used in the food processing industry tend to break up such soft chips, and smash or mash the chips into the machine, which results in food waste, and requires expensive and time consuming cleaning and repair.

Furthermore, in the food processing art, it is important that the various ingredients of the food product flow continuously through the machine, without stagnating at any point in the process. Otherwise, the food ingredients will collect and deteriorate with are, thereby causing both waste, and possible sanitation problems.

It is also important in the food processing art that the amounts of the various ingredients in the food product be controlled carefully, so as to consistently provide food products of uniform quality and composition.

SUMMARY OF THE INVENTION

One aspect of the present invention is to provide an apparatus for depositing chips of chocolate, fudge, and the like onto food products without breaking or smashing the chips. The apparatus comprises a hopper shaped to retain the chips therein, and a depositor roll having a peripheral surface with a plurality of recessed pockets into which the chips are received. A feed plate extends from an outlet portion of the hopper to the depositor roll at an elevation substantially commensurate with the longitudinal axis of the depositor roll. The feed plate preferably has a length which is greater than twice the largest dimension one of of the chips, and produces a dynamic, free-surface reservoir in which the chips temporarily pool prior to lodging in the depositor roll pockets. When the depositor roll is rotated, the chips continuously feed from the hopper along the feed plate, and gently into the depositor roll pockets. The chips are then swept upwardly in the pockets, out of the chip reservoir, and deposited onto the food products that are conveyed under the depositor roll.

Preferably, the feed plate is inclined downwardly, so that the chips feed into the depositor roll by virtue of gravitational forces, and an adjustable metering device is provided on the hopper to adjust chip flow onto the feed plate. The depositor roll may be lowered by a variable speed motor and/or gearbox to adjust the rate at which the chips are distributed onto the food products.

The principal objects of the present invention are to provide an apparatus and method for gently depositing chips of chocolate, fudge, and other soft or crumbly food bits onto various food products, without breaking or smashing the chips. The chip depositor has a continuous feed which is capable of rapid food processing, without requiring a stagnant reservoir in which the chips can collect and deteriorate with age. The chip depositor is quite reliable, and fully adjustable to evenly distribute different chip patterns and flow rates. The depositor has an uncomplicated construction which is efficient in use, relatively economical to manufacture, capable of a long operating life, easy to maintain, and particularly well adapted for the proposed use.

These and other features, advantages and objects of the present invention will be further understood and appreciated by those skilled in the art by reference to the following written specification, claims and appended drawings.

BRIEF DESCRIPTION OF THE DRAWINGS

FIG. 3 is a front elevational view of the chip depositor.

FIG. 4 is a vertical cross-sectional view of the chip depositor, taken along the life IV—IV of FIG. 3.

FIG. 5 is a side elevational view of an adjustable hopper sidewall portion of the chip depositor.

FIG. 6 is a perspective view of the adjustable hopper sidewall, with a portion thereof broken away.

FIG. 7 is an enlarged, partially schematic, vertical cross-sectional view of the chip depositor, showing the chips feeding into a depositor roll portion thereof.

FIG. 8 is an enlarged, partially schematic, vertical cross-sectional view of the chip depositor, showing the chips being dispensed from the depositor roll onto food products conveyed therebelow.

FIG. 9 is an exploded, perspective view of the chip depositor.

FIG. 10 is a perspective view of the chip depositor, wherein an adjustable feed gate portion thereof has been removed.

DETAILED DESCRIPTION OF THE PREFERRED EMBODIMENTS

Figure 1:
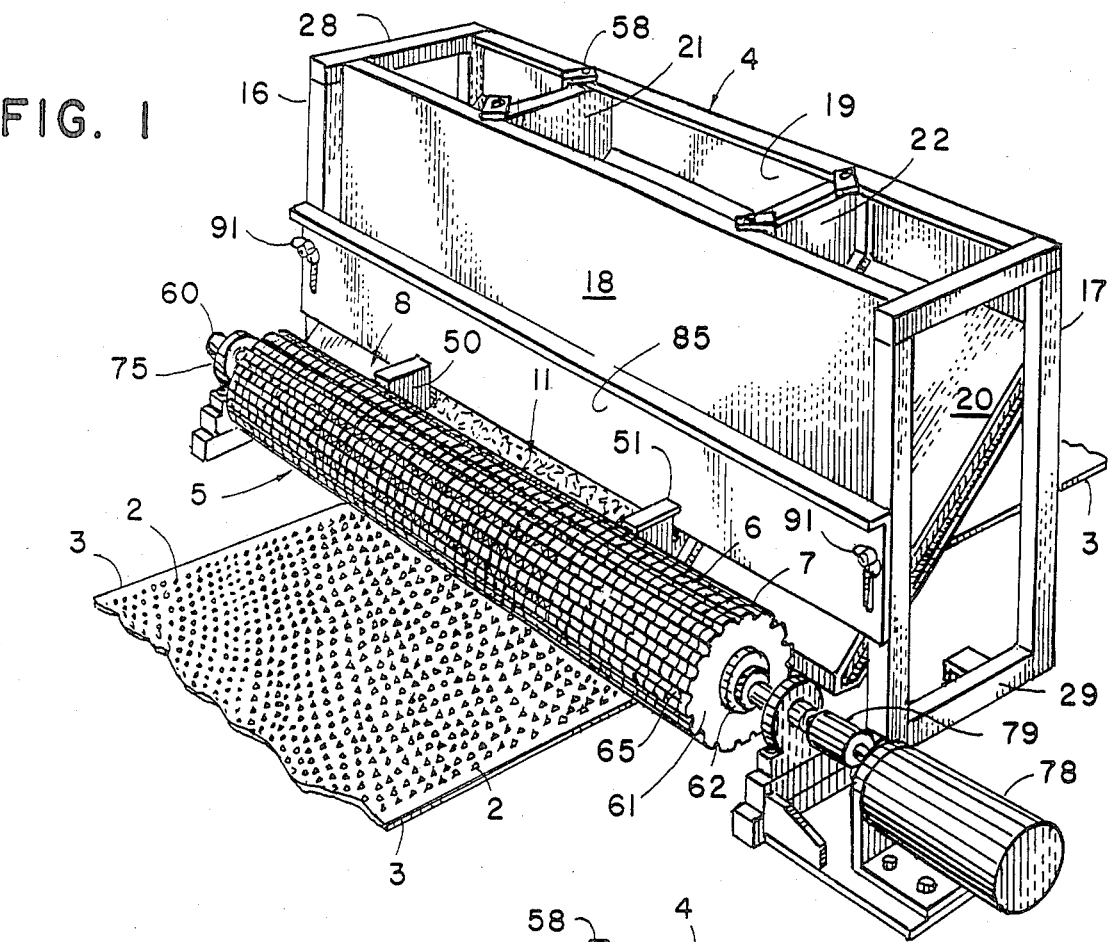
FIG. 1 is a perspective view of a chip depositor embodying the present invention, and illustrates a method for depositing chocolate chips and the like onto edible food products.

For purposes of description herein, the terms "upper," "lower," "right," "left," "rear," "front," "vertical," "horizontal" and derivatives thereof shall relate to the invention as oriented in FIG. 1. However, it is to be understood that the invention may assume various alternative orientations, and step sequences, except where expressly specified to the contrary.

The reference numeral 1 (FIG. 1) generally designates a depositor 1 for dispensing or scattering chips 2 of chocolate, fudge, and the like onto food products, such as the illustrated sheet of granola 3. Chip depositor 1 comprises a hopper 4 shaped to retain the chips 2 therein, and a depositor roll 5 having a peripheral surface 6 with a plurality of recessed pockets 7 in which the chips 2 are received. A feed plate 8 (FIG. 2) extends from an outlet portion 9 of hopper 4 to depositor roll 5 at an elevation substantially commensurate with longitudinal axis 10 of depositor roll 5. Feed plate 8 preferably has a length which is greater than twice the largest dimension of one of the chips 2 to produce a dynamic, free-surface reservoir 11 in which the chips 2 temporarily pool prior to lodging in the depositor roll pockets 7. When depositor roll 5 is rotated about axis 10, the chips 2 continuously feed from hopper 4, along feed plate 8, and gently into the pocket 7 of depositor roll 5. The chips 2 are then swept upwardly in pockets 7 out of chip reservoir 11, and are deposited onto the granola sheet 3 conveyed under depositor roll 5, without breaking or smashing the chips 2. Feed plate 8 introduces the chips 2 to depositor roll 5 at an elevation which prevents the chips 2 from being carried over the top of depositor roll 5, or otherwise overshooting reservoir 11.

The chips 2 for which depositor 1 is specifically designed to dispense or distribute are small bits, chunks or morsels of relatively soft, frangible, or crumbly material, such as chocolate, fudge, pretzel sticks, peanuts, marshmallows, fruit bits, and the like. It is to be understood that the term "chip" or "chips," as used herein, is intended to encompass all such articles, as well as other similar discrete food bits, which are soft, frangible, and/or crumbly and are preferably applied to the food product whole or intact, without breakage or deformation. In the illustrated example, chips 2(FIGS. 7 and 8) comprise conventional drops or conically-shaped bits of chocolate. The illustrated chips 2 have a substantially uniform size and shape to facilitate even distribution of the chips 2 onto granola sheet 3, as described in greater detail hereinafter.

As best illustrated in FIGS. 9 and 10, the illustrated hopper 4 comprises a pair of end frames 16 and 17, a front wall 18, a rear wall 19, an inclined bottom 20, and adjustable sidewalls 21 and 22. Support blocks 23 and 24 are rigidly attached to end frames 16 and 17, and extend forwardly thereof to facilitate mounting depositor roll 5 thereon. A support plate 25 is mounted on support block 24, and extends laterally outwardly therefrom. In the example illustrated in FIGS. 9 and 10, end frames 16 and 17 are constructed from rigid, square tubing, and have a substantially rectangular side elevational shape, with a front leg 26, a rear leg 27, an upper leg 28, and a lower leg 29. Feet 30 are attached to the lower portions of end frames 16 and 17, and extend laterally inwardly thereof to assist in supporting chip depositor 1 on a work surface.

Figure 2:
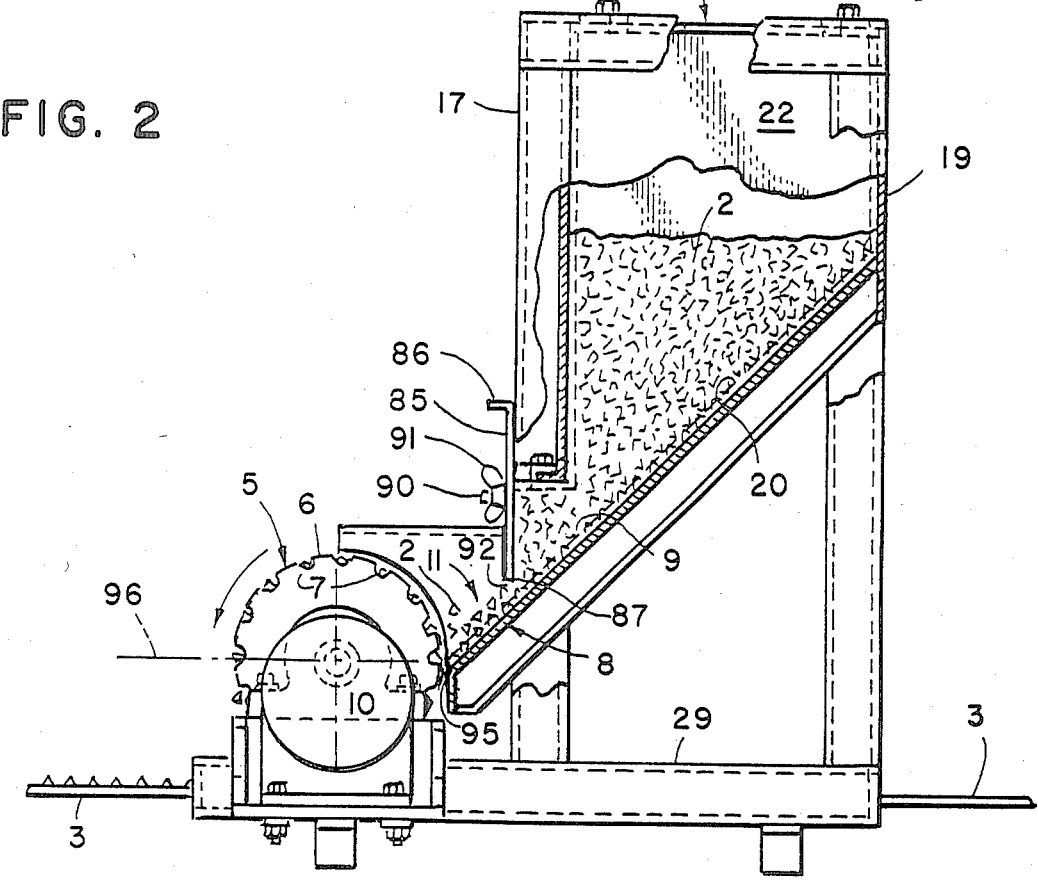
FIG. 2 is a side elevational view of the chip depositor, with portions thereof broken away to reveal internal construction.

The front wall 18 of hopper 4 comprises a flat panel, with upper and lower flanges 34 and 35 respectively. Front wall 18 is fixedly attached to the rear faces of end frame front legs 26. The rear wall 19 of hopper 4 comprises a flat panel having its lower edge attached to the rear edge of hopper bottom 20, and includes an inwardly turned flange 38 extending along its upper edge. Rear wall 19 is attached to the rearward faces of end frame rear legs 27. The bottom 20 of hopper 4 comprises a flat panel, having a downwardly turned peripheral edge or apron 40. The side edges of hopper bottom 20 are rigidly attached to the front and rear legs 26 and 27 of end frames 16 and 17. With reference to FIG. 2, in the illustrated configuration of the present invention, hopper bottom 20 is inclined downwardly, and extends from rear wall 19 into a position adjacent to the peripheral surface 6 of depositor roll 5, thereby defining both the bottom of hopper 4, and feed plate 8. However, it is to be understood that the present invention contemplates that feed plate 8 may be separate from hopper 4.

Adjustable sidewalls 21 and 22 (FIGS. 5 and 6) are substantially identical in construction, and have a generally trapezoidal side elevational shape, comprising a flat vertical plate 44, with a laterally extending upper flange 45, front flange 46, rear flange 47 and bottom flange 48. A ledge 49 extends perpendicularly from the lower edge of front flange 46 to facilitate attaching adjustable sidewalls 21 and 22 to hopper 4 in the manner described below. Reservoir side guards 50 and 51 are formed integrally on the lower, forward portions of hopper sidewalls 21 and 22, and each includes an arcuate forward edge 52 that is shaped to mate closely with the peripheral surface 6 of depositor roll 5.

Bottom flange 48 extends all the way from rear flange 47 to the lowermost surface of forward edge 52. Reservoir sides 50 and 51 also include an upper flange 53, and a vertically extending slot 54 disposed between ledge 49 and flange 53 for purposes to be described below.

As best illustrated in FIGS. 9 and 10, adjustable sidewalls 21 and 22 are closely received in the interior of hopper 4, and extend along front wall 18, rear wall 19, and bottom 20. The upper flanges 45 of sidewalls 20 and 21 extend underneath the upper flanges 34 and 38 of front wall 18 and rear wall 19. The reservoir sides 50 and 51 of adjustable sidewalls 21 and 22 extend through the outlet opening 9 of hopper 4, and protrude forwardly of hopper front wall 18. The ledge portions 49 of adjustable sidewalls 21 and 22 are positioned directly below the lower flange 35 of hopper front wall 18. Hopper sidewalls 21 and 22 are shaped so that they slide laterally within hopper 4 to adjust the width of the chip distribution pattern. A plurality of clips 58 detachably mount adjustable sidewalls 21 and 22 within hopper 4 at the selected lateral position. In the illustrated structure, both sidewalls 21 and 22 are attached to hopper 4 by three clips 58, located at opposite sides of upper flanges 45, and at ledge 49.

The illustrated depositor roll 5 has a cylindrical shape, and extends laterally across chip distributor 1 at a forward portion thereof. In the embodiment illustrated in FIG. 1, depositor roll 5 comprises an elongated shaft 60 on which a plurality of separate discs 61 are mounted in a side-by-side fashion. Discs 61 have a width greater than the largest dimension of one of the chips 2, and in the illustrated example, are approximately $\frac{5}{8}$ inches wide. Discs 61 may be rotated on shaft 60 with respect to each other, so as to achieve a selected distribution pattern. A threaded clamping collar 62 securely retains discs 61 in the selected angular configuration.

In the example illustrated in FIG. 1, depositor roll pockets 7 comprise grooves 65 in the peripheral surface of the discs 61, which extend axially from one side of the disc to the other. Hence, when the disc grooves 65 are in substantial alignment, the pockets 7 have open ends, which do not laterally constrain or positively retain the chips therein. This open ended pocket provided by grooves 65 reduces chip breakage, and also facilitates chip withdrawal. The illustrated discs 61 have an outside diameter of approximately 6 inches, and each disc includes sixteen grooves 65 that are spaced evenly about the circumference of the disc.

As best illustrated in FIGS. 7 and 8, pockets 7 are substantially identical in configuration, and have a unique, saw-tooth, vertical cross-sectional shape which facilitates efficiently picking the chips 2 from reservoir 11, without breaking the same. In this example, each pocket 7 is defined by a leading surface 68, a bottom surface 69, and a trailing surface 70. Pocket 7 has a relatively flat bottom surface 69 oriented generally perpendicular to a radial reference plane 71, which extends from the longitudinal axis 10 of depositor roll 5 through the center of pocket 7. The trailing surface 70 of pocket 7 is also relatively flat, and is oriented substantially parallel with radial reference plane 71. Trailing surface 70 intersects the peripheral surface 6 of depositor roll 5 at an angle of approximately 90 degrees to facilitate picking the chips 2 out of reservoir 11. An arcuate radius area 72 is provided in pocket 7 at the intersection of bottom surface 69 and trailing surface 70. The leading surface 68 of pocket 7 is also substantially flat, but is inclined in the direction of depositor roll rotation to facilitate chip withdrawal. Preferably, leading surface 68 is inclined at an angle in the range of 35 to 55 degrees, and more particularly 45 degrees, from radial reference plane 71.

Preferably, pockets 7 (FIGS. 7 and 8) have a radially measured depth that is sized to receive at least one chip 2 therein, and a circumferentially measured width and an axially measured length sized to receive a single chip 2 wholly therein, such that each of the pockets 7 accept only a single layer of chips 2 from reservoir 11, and those chips 2 disposed in pockets 7 do not normally protrude outwardly therefrom. In this manner, those chips which lodge in pockets 7 are not jarred out of the pockets 7 by contact with adjacent chips in reservoir 11. Furthermore, as depositor roll 5 sweeps through reservoir 11, there is no grinding action among the chips that would cause them to break. The chips 2 are lifted gently and consistently from reservoir 11.

Depositor roll 5 (FIG. 3) is supported on end frames 16 and 17 of hopper 4 by a pair of bearings or pillow blocks 75 and 76. A shim 77 may be positioned between pillow blocks 75 and 76 and the associated support blocks 23 and 24 to facilitate varying the elevation of depositor roll 5 with respect to feed plate 8 for those purposes described below. A motor/gearbox 78 is mounted on support plate 25, and is connected with the adjacent end of depositor roll shaft 60 by a coupling 79, such that activation of motor/gearbox 78 rotates depositor roll 5 about its longitudinal axis 10 at a variable rate of rotation.

With reference to FIGS. 9 and 10, a slide gate 85 is mounted on the forward portion of hopper 4 to meter the flow of chips 2 through the outlet opening 9 of hopper 4. Slide gate 85 comprises a rigid, flat panel with a flanged upper edge 86, a lower edge 87 and opposing side edges 88. Vertically oriented slots 89 are positioned at the opposite sides of slide gate 85, and are shaped to closely receive therethrough mating, threaded studs 90 mounted on the forward faces of front frame legs 26. Wing nuts 91 are attached to threaded studs 90, and adjustably mount slide gate 85 on hopper 4 for selected vertical movement. As best illustrated in FIG. 2, the lower edge 87 of slide gate 85, in conjunction with a vertically aligned portion of hopper bottom 20, forms an adjustable orifice 92 through which the chips 2 flow by virtue of gravitational forces from hopper 4 onto feed plate 8 and depositor roll 5. In the illustrated example, slide gate 85 is positioned so that only a single layer of chips 2 is dispensed from hopper 4 onto feed plate 8.

The one-piece hopper bottom 20 and feed plate 8 is flat, and is preferably inclined downwardly at an angle in the range of 35 to 55 degrees from the horizon, more specifically around 45 degrees, such that the chips 2 flow from hopper 4 into depositor roll 5 by virtue of gravitational forces alone, in order to minimize chip breakage. The illustrated feed plate 8 has a length in the range of 2 to 4 inches, and more specifically, approximately 3 inches. The outermost edge 95 of feed plate 8 is positioned adjacent to the peripheral surface 6 of depositor roll 5, at an elevation generally commensurate with the elevation of the longitudinal axis 10 of depositor roll 5. In the illustrated example, feed plate edge 95 is spaced apart from the peripheral surface 6 of depositor roll 5 by an amount that is substantially smaller than the largest dimension of one of the chips 2, such as a dimension in the range of 0.10 to 0.05 inches. Furthermore, it is preferred that feed plate edge 95 be disposed at an elevation slightly below the elevation of a horizontal reference plane 96 passing through the longitudinal axis 10 of depositor roll 5, so that gravity provides positive feed of the chips 2 into pockets 7. More particularly, it is preferred that feed plate edge 95 lie in a plane (coplanar with hopper bottom 20) which intersects the peripheral surface 6 of depositor roll 5 at an angle in the range of 15 to 25 degrees from horizontal reference plane 96, and more specifically, around 20 degrees. The point at which the chips 2 are introduced to pocket 7 on feed plate 8 is believed to be important to prevent chip breakage, and also to prevent the chips from overshooting reservoir 11, or otherwise flowing over depositor roll 5, outside of pockets 7.

In operation, the sidewalls 21 and 22 of hopper 4 are laterally adjusted so that they coincide with the width of granola sheet 3. Hopper sidewalls 21 and 22 are then securely locked in place at the desired position by clips 58. Slide gate 85 is adjusted vertically in accordance with the size of the chips 2, and the desired distribution pattern. Under normal circumstances, it is preferred that slide gate 85 be adjusted so as to permit only a single layer of the chips 2 to be dispensed onto feed plate 8. In this manner, reservoir 11 will contain only that amount of chips necessary to efficiently and consistently fill pockets 7, without any unnecessary rubbing or bumping between the chips in reservoir 11. The chips 2 are then deposited into hopper 4, and motor/gearbox 78 is activated to rotate depositor roll 5 in a counterclockwise direction, as viewed in FIG. 2. The speed of depositor roll rotation is varied with respect to the speed at which granola sheet 3 is conveyed thereunder to produce the desired chip feed rate and distribution pattern. As depositor roll 5 is rotated, the chips 2 continuously feed from hopper 4 along feed plate 8 to reservoir 11. Side panels 50 and 51 keep the chips 2 from translating laterally off of depositor roll 5. The chips 2 then lodge in the pockets 7 of depositor roll 5, and are thence swept upwardly out of reservoir 11, translated around to the forward side of depositor roll 5, and fall out of pockets 7 onto the granola sheet 3 moving thereunder. The operator may also adjust the elevation of depositor roll 5 with respect to feed plate 8 by varying shims 77 in order to minimize chip breakage.

Chip depositor 1 is capable of gently depositing chips of chocolate, fudge, and other soft food bits onto food products, like the illustrated granola sheet 3, without breaking or smashing the chips 2. The chip depositor has a unique feed arrangement which is capable of continuously feeding the chips 2 in a rapid and reliable manner, without requiring any large reservoir area in which the chips can stagnate, and then deteriorate with age. Adjustable hopper sidewalls 21 and 22, adjustable slide gate 85 and variable motor/gearbox 78 facilitate easily adapting the chip depositor for a wide variety of different applications.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows.

1. A method for depositing chips of chocolate, fudge or soft or crumbly food, on edible food products, comprising the steps of:
depositing a plurality of chips into a feed hopper having an outlet opening through which the chips are dispensed from said hopper;
positioning a depositor roll at a preselected distance from the hopper, and mounting the depositor roller for rotation about a longitudinal axis thereof; said depositor roller having a peripheral surface with a plurality of recessed pockets shaped for receiving the chips therein;
conveying the food products below the depositor roll;
dispensing the chips from the hopper outlet opening onto a feed plate, which extends from the outlet opening of the hopper to the peripheral surface of the depositor roll;
flowing the chips along the feed plate from the outlet opening of the hopper into the depositor roll;
feeding the chips from the feed plate into the depositor roll at an elevation generally commensurate with the elevation of the horizontal axis of the depositor roll; and
rotating the depositor roll about the longitudinal axis thereof in a direction which carries the chips away from said feed plate, whereby the chips continuously feed from the hopper along the feed plate, and into the pockets of the depositor roll, and are thence carried around the depositor roll and deposited onto the food products to be coated as they are conveyed therebelow without breaking the chips.

2. A method as set forth in claim 1, wherein:
said chip feeding step comprises feeding the chips into the depositor roll along a plane which intersects the peripheral surface of the depositor roll at an angle in the range of 15 to 25 degrees, as measured downwardly from a horizontal reference plane passing through the longitudinal axis of the depositor roll.

3. A method as set forth in claim 2, including:
dimensioning the feed plate to have a length which is greater than twice the largest dimension of one of the chips, thereby producing a dynamic, free-surface reservoir between the hopper outlet opening and the peripheral surface of the depositor roll in which the chips temporarily pool prior to lodging in the pockets of the depositor roll.

4. A method as set forth in claim 3, including:
selecting the chips of a predetermined size and configuration, such that each pocket picks only a single layer of chips from the reservoir, and those chips disposed in the pockets do not normally protrude outwardly therefrom.

5. A method as set forth in claim 4, including:
metering the flow of chips through the hopper outlet opening, whereby only a single layer of chips is dispensed from the hopper onto the feed plate.

6. A method as set forth in claim 5, wherein:
said chip dispensing step comprises gravity feeding the chips from the hopper, onto the feed plate.

7. A method as set forth in claim 6, wherein:
said chip flowing step comprises gravity feeding the chips along the feed plate and into the reservoir.

8. A method as set forth in claim 7, wherein:
said chip depositing step comprises permitting the chips to drop out of the pockets under gravitational forces, and fall freely onto the food products being conveyed thereunder.

9. A method as set forth in claim 8, including:
varying the speed of rotation of the depositor roll with respect to the speed at which the food products are conveyed thereunder to produce different chip distribution patterns.

10. A method as set forth in claim 9, including:
adjusting the elevation of the depositor roll with respect to the elevation of the edible food products conveyed thereunder.

11. A method as set forth in claim 1, including:
dimensioning the feed plate to have a length which is greater than twice the largest dimension of one of the chips, thereby producing a dynamic, free-surface reservoir between the hopper outlet opening and the peripheral surface of the depositor roll in which the chips temporarily pool prior to lodging in the pockets of the depositor roll.

12. A method as set forth in claim 1, including:
selecting the chips of a predetermined size and configuration, such that each pocket picks only a single layer of chips, and those chips disposed in the pockets do not normally protrude outwardly therefrom.

13. A method as set forth in claim 1, including:
metering the flow of chips through the hopper outlet opening, whereby a single layer of chips is dispensed from the hopper onto the feed plate.

14. A method as set forth in claim 1, wherein:
said chip dispensing step comprises gravity feeding the chips from the hopper onto the feed plate.

15. A method as set forth in claim 1, wherein:
said chip flowing step comprises gravity feeding the chips along the feed plate.

16. A method as set forth in claim 1, including:
varying the speed of rotation of the depositor roll with respect to the speed at which the food products are conveyed thereunder to produce different chip distribution patterns.

17. A method as set forth in claim 1, including:
adjusting the elevation of the depositor roll with respect to the elevation of the food products conveyed thereunder.

* * * * *